United States Patent
Dantwala

(10) Patent No.: US 6,810,081 B2
(45) Date of Patent: Oct. 26, 2004

(54) METHOD FOR IMPROVING ACCURACY OF BLOCK BASED MOTION COMPENSATION

(75) Inventor: Nehal R. Dantwala, Peekskill, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 610 days.

(21) Appl. No.: 09/738,644

(22) Filed: Dec. 15, 2000

(65) Prior Publication Data

US 2002/0075959 A1 Jun. 20, 2002

(51) Int. Cl.⁷ .............................. H04N 5/44; H04B 1/66
(52) U.S. Cl. ................................................. 375/240.16
(58) Field of Search ........................ 375/240.01, 240.9, 375/240.12, 240.14, 240.16, 240.17; 348/448, 452, 699, 700; 382/236, 238, 240; H04B 1/66; H04N 5/44

(56) References Cited

U.S. PATENT DOCUMENTS

| | | | | |
|---|---|---|---|---|
| 5,365,280 A | * | 11/1994 | De Haan et al. | 348/699 |
| 5,929,919 A | * | 7/1999 | De Haan et al. | 348/452 |
| 6,240,211 B1 | * | 5/2001 | Mancuso et al. | 382/236 |
| 6,331,874 B1 | * | 12/2001 | de Garrido et al. | 348/452 |
| 6,340,990 B1 | * | 1/2002 | Wilson | 348/448 |
| 6,438,170 B1 | * | 8/2002 | Hackett et al. | 375/240.16 |
| 2002/0031272 A1 | * | 3/2002 | Bagni et al. | 382/236 |

FOREIGN PATENT DOCUMENTS

| | | | |
|---|---|---|---|
| EP | 735747 A1 | * 10/1996 | .......... H04N/05/44 |
| EP | 1006732 A2 | 6/2000 | |
| GB | 2205707 A | 12/1988 | |

OTHER PUBLICATIONS

"Local Motion–Adaptive Interpolation technique based on Block Matching Algorithms", by Joon–Seek Kim et al., Signal Processing Image Communication, vol. 4, Nov. 1992, No. 6.

* cited by examiner

Primary Examiner—Tung T. Vo
(74) Attorney, Agent, or Firm—Laurie Gathman

(57) ABSTRACT

For use in a video image upconversion unit of the type that uses motion compensation to generate an interpolated field using motion vectors, an improved method of motion compensation is disclosed. The method performs motion compensation on a pixel and determines whether a motion vector assigned to the pixel is correct or incorrect. If the motion vector is incorrect, the method sets the value of the pixel to a previously recorded pixel value. The previously recorded pixel value is obtained by calculating for the pixel the difference between the value of a corresponding motion compensated pixel from a previous frame and the value of a corresponding motion compensated pixel from a next field. The difference is then compared with a threshold value. If the difference is less than the threshold value, then the value of the pixel is set equal to the average of the value of the corresponding motion compensated pixel from the previous frame and the value of the corresponding motion compensated pixel from the next field.

35 Claims, 8 Drawing Sheets

METHOD FOR IMPROVING ACCURACY OF BLOCK BASED MOTION COMPENSATION

TECHNICAL FIELD OF THE INVENTION

The present invention comprises an improved method of block based motion compensation in a video image upconversion unit of the type that uses block based motion compensation to generate an interpolated video field using motion vectors. The improved method of the present invention obtains accurate values for motion compensated pixels when incorrect motion vectors are assigned to the pixels.

BACKGROUND OF THE INVENTION

A moving video image is transmitted by a video transmitter as a sequence of frames or pictures. Each frame or picture may be coded individually, but is displayed sequentially at a video rate. Each video frame is made up of two video fields, an odd video field and an even video field. More specifically, an individual frame denoted by the letter "A" is made up of an odd field denoted by the letters "Ao" and an even field denoted by the letters "Ae."

When capturing or recording a video sequence, either frames or fields may be captured. When both the odd field and the even field of a video frame are captured at the same time, the picture is said to be a "progressive" picture. The odd fields and the even fields are not generally used to describe progressive pictures. Instead the individual video frames (e.g., frame A, frame B) are used to describe progressive pictures. Most movie film material is composed of progressive pictures.

When the odd field and the even field of a video frame are captured at different times, the picture is said to be an "interlaced" picture. The two fields are not combined to be displayed at the same time. Each field is treated and displayed separately. Most television material is composed of interlaced pictures.

In order to achieve maximum efficiency during the transmission process, not every field or frame is transmitted. That is, some of the individual fields or frames are dropped and are not transmitted. The dropped fields or frames are recreated by the video receiver from information taken from the fields or frames that are transmitted.

For example, the dropped fields or frames can be recreated simply by repeating the previous field or frame. Alternatively, if the display is delayed, the next field or frame that follows the dropped field or frame can be used to take the place of the dropped field or frame. It is also possible to replace the dropped field or frame by averaging the neighboring fields or frames on each side of the dropped field or frame.

There are difficulties with these simple approaches. Repeating a previous field or frame (or using the next following field or frame) in place of the dropped field or frame causes the perceived image to be jerky even when small motions are depicted in the video image. Averaging the fields or frames causes the perceived image to be blurred even when moderate motions are depicted in the video image.

A well known method for recreating the dropped fields or frames is motion compensated interpolation. In motion compensated interpolation (also referred to as "bidirectional prediction") a subsignal with a low temporal resolution (typically one half to one third of the frame rate) is coded and the full resolution signal is obtained by interpolation of the low resolution signal and the addition of a correction term. The signal to be reconstructed by interpolation is obtained by adding a correction term to a combination of a past and a future reference.

Video sequences exist in various formats. For example, high definition (HD) television video sequences may be displayed in any one of eighteen (18) different formats. The process of converting a video sequence from one format to another format is called "scan rate conversion."

Scan rate conversion may be used to reduce image flicker in television images. For example, a European televison video standard specifies a frequency of fifty Hertz (50 Hz). That is, the video fields are to be displayed at a rate of fifty fields per second. This televison video rate is not sufficient to prevent noticeable flicker in the television image. To reduce image flicker, the television video rate may be increased to one hundred Hertz (100 Hz) by interpolating additional fields between the original fields in the video image.

Scan rate conversion techniques may be used to convert twenty four Hertz (24 Hz) film to sixty Hertz (60 Hz) video images.

Scan rate conversion techniques may also be used to convert thirty Hertz (30 Hz) high definition (HD) camera images to sixty Hertz (60 Hz) video images.

The additional fields needed for scan rate conversion may be acquired by simply repeating the original fields. The preferred method, however, is to use a progressive to interlace conversion using motion compensated interpolation.

There is a need in the art for an improved method of motion compensation to generate interpolated fields that will provide a sharp video image. In particular, there is a need in the art for an improved method for obtaining accurate values for motion compensated pixels when incorrect motion vectors are assigned to the pixels.

SUMMARY OF THE INVENTION

The present invention is designed to be used in a video image upconversion unit of the type that uses motion compensation to generate an interpolated field using motion vectors. The present invention comprises an improved method of motion compensation that performs motion compensation on a pixel and determines whether a motion vector associated with the pixel is correct or incorrect.

If the motion vector is incorrect, the method sets the value of the pixel to a previously recorded pixel value. The previously recorded pixel value is obtained by calculating for the pixel the difference between the value of a corresponding motion compensated pixel from a previous frame and the value of a corresponding motion compensated pixel from a next field. The difference is then compared with a threshold value. If the difference is less than the threshold value, then the value of the pixel is set equal to the average of the value of the corresponding motion compensated pixel from the previous frame and the value of the corresponding motion compensated pixel from the next field.

The improved method of the invention comprises the steps of (1) calculating for a pixel within an array of n pixels by m pixels the difference in value between the value of a corresponding motion compensated pixel from a previous frame and the value of corresponding motion compensated pixel from a next field, (2) comparing the difference with a threshold value, (3) setting the value of the pixel with said array of n pixels by m pixels equal to the average of the value of the corresponding motion compensated pixel from said previous frame and the value of the corresponding motion compensated pixel of the next field if the value of the difference is less than the threshold value, and (4) recording the value for the pixel within the array of n pixels by m pixels.

The improved method of the invention also comprises the steps of (1) calculating for a pixel within a block of pixels the difference in value between the value of a corresponding motion compensated pixel from a previous frame and the value of a corresponding motion compensated pixel from a next field, (2) comparing the difference with a threshold value, and (3) setting the value of the pixel within the block of pixels to the average of the value of the corresponding motion compensated pixel from the previous frame and the value of the corresponding motion compensated pixel of the next field, if the value of the difference is less than the threshold value, and (4) setting the value of the pixel within the block of pixels equal to the value that was previously recorded for the pixel when the pixel was evaluated as a pixel element within the array of n pixels by m pixels, if the value of the difference is not less than the threshold value.

It is a primary object of the present invention to provide an improved method motion compensated upconversion in a video image upconversion unit of the type that uses motion compensation to generate an interpolated video field using motion vectors.

It is an additional object of the present invention to provide a method for obtaining an accurate value for a motion compensated pixel for inclusion in a generated field to be interpolated between a previous frame and a next field.

It is another object of the present invention to provide an improved method for obtaining an accurate value for a motion compensated pixel that will provide a sharp video image in a generated field to be interpolated between a previous frame and a next field by determining whether the motion vector associated with the pixel is correct or incorrect.

It is also an object of the present invention to provide an improved method for obtaining an accurate value for a motion compensated pixel that will provide a sharp video image in a generated field to be interpolated between a previous frame and a next field by providing an accurate pixel value when the motion vector that is associated with the pixel is incorrect.

It is an additional object of the present invention to provide an improved method for determining a threshold value to be used to obtain an accurate value for a motion compensated pixel that will provide a sharp video image in a generated field to be interpolated between a previous frame and a next field.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 11, discussed below, and the various embodiments set forth in this patent document to describe the principles of the present invention are by way of illustration only and should not be construed in any way to limit the scope of the invention. In the descriptions of the advantageous embodiments that follow, the improved method of the present invention is used in connection with a high definition (HD) progressive to interlace converter.

The present invention comprises an improved method of block based motion compensation that selects an appropriate motion compensated pixel by obtaining an accurate value for the motion compensated pixel when an incorrect motion vector has been assigned to the pixel. It is important to realize that the method of the present invention is not limited to use in an HD progressive to interlace converter. Those skilled in the art will readily understand that the principles of the present invention may also be successfully applied in any type of electronic equipment that applies motion compensation techniques to video signals. In the descriptions that follow, the HD progressive to interlace converter is described as an example of an item of equipment in which the improved method of the present invention may be employed.

Figure 1:
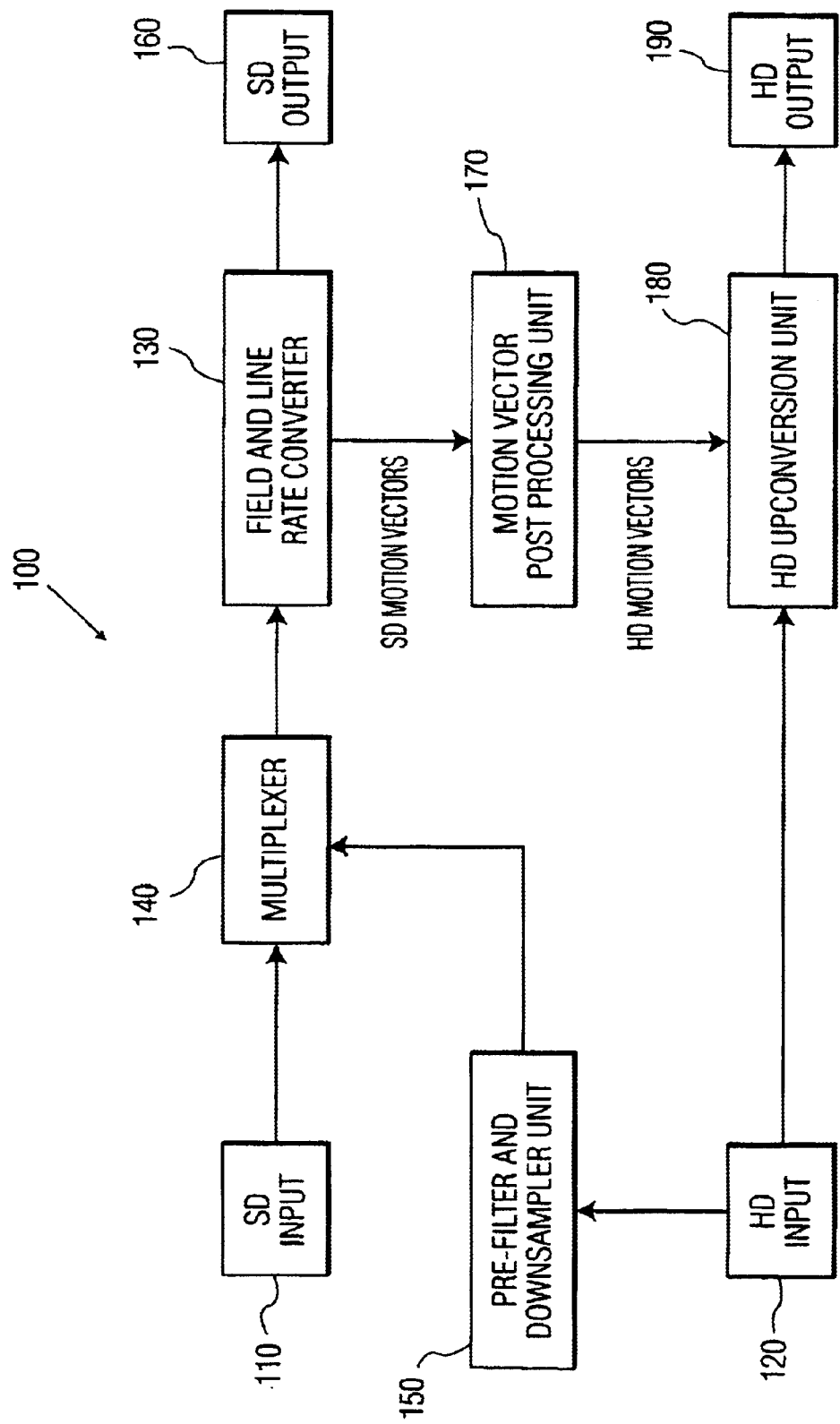
FIG. 1 is a block diagram of an exemplary high definition (HD) progressive to interlace converter that utilizes the improved method of the present invention.

FIG. 1 illustrates high definition (HD) progressive to interlace converter 100. HD progressive to interlace converter 100 receives standard definition (SD) video signals from SD input 110 or receives HD video signals from HD input 120. As will be explained below in greater detail, HD progressive to interlace converter 100 converts progressive HD material to interlaced format using motion compensation techniques.

HD progressive to interlace converter 100 comprises field and line rate converter 130. Field and line rate converter 130 comprises an SAA4992 integrated circuit (sometimes referred to as FALCONIC for "field and line rate converter integrated circuit"). The SAA4992 integrated circuit is sold commercially by Philips Semiconductors Corporation. Field and line rate converter 130 is capable of performing scan rate conversions for SD size video images.

As shown in FIG. 1, field and line rate converter 130 receives SD video signals from SD input 110 via multiplexer 140. If the input to HD progressive to interlace converter 100 is an SD input, the SD video images simply pass through multiplexer 140 directly to field and line rate converter 130. The SD video images are then output to SD output 160.

HD progressive to interlace converter 100 receives HD video signals from HD input 120. If the input to HD progressive to interlace converter 100 is an HD input, the HD video images must be pre-filtered and downsampled to SD size. This is accomplished in pre-filter and downsampler unit 150. The SD video images from pre-filter and downsampler unit 150 are then sent to multiplexer 140 and passed on to field and line rate converter 130.

The filter (not shown) in pre-filter and downsampler unit 150 is a conventional low pass filter used to satisfy the Nyquist criteria. The filter may comprise an eleven tap filter that uses the following filter taps: (1) 0.015625 (2) 0 (3) −0.0703125 (4) 0 (5) 0.3046875 (6) 0.5 (7) 0.3046875 (8) 0 (9) −0.0703125 (10) 0 and (11)0.015625.

After the HD video images are filtered, they are downsampled by a factor of one or two or three based on the following conditions. The downsample factor is set equal to three (1) if the number of pixels per line is greater than 1440 and less than or equal to 2160, or (2) if the number of lines per frame is greater than 1152 and less or equal to 1728. The downsample factor is set equal to two (1) if the number of pixels per line is greater than 720, or (2) if the number of lines per frame is greater than 576. If the above described conditions are not met, then the video image is an SD video image and no downsampling is required. In that case the downsample factor is set equal to one. It is anticipated that a video image that is larger than 2160 pixels by 1728 pixels will require a downsampling factor of four. At the present time the largest size video image known to be in use is 1920 pixels by 1080 pixels.

After the downsizing process is completed, an SD size video image is generated and sent to field and line rate converter 130 for motion estimation. Field and line rate converter 130 generates motion vectors for the downsampled SD size video images. The SAA4992 integrated circuit of field and line rate converter 130 supports a motion vector overlay mode. That is, the motion vectors generated by field and line rate converter 130 are overlayed on the video images as color data. This feature permits the motion vectors to be read directly from field and line rate converter 130. That is, no additional hardware or software functionality is needed to obtain the motion vectors.

After the SD motion vectors are obtained, they are sent to motion vector post processing unit 170. The SD motion vectors are scaled to HD velocity (i.e., magnitude) in motion vector post processing unit 170. As will be explained more fully, the scaled HD motion vectors are then used to generate motion compensated interlaced HD fields from HD progressive frames.

The SAA4992 integrated circuit of field and line rate converter 130 functions as a high quality motion estimator. Because the SAA4992 integrated circuit of field and line rate converter 130 uses one frame and one field to perform motion estimation, the same technique of using one frame and one field must be used for motion compensation.

Figure 2:
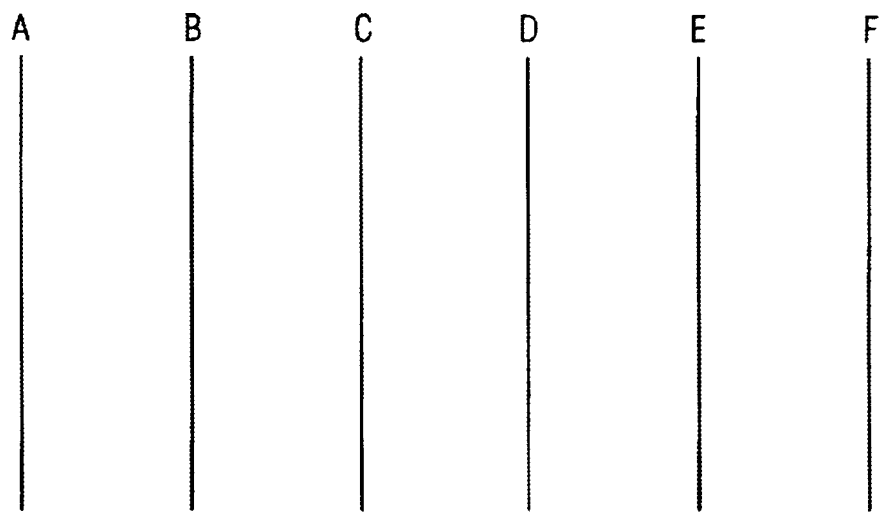
FIG. 2 illustrates a series of input progressive frames of a video signal.

As shown in FIG. 2, the input consists of the progressive frames A, B, C, D, E and F. As previously mentioned, each frame consists of an odd field and an even field. For example, frame "A" consists of an odd field "Ao" and an even field "Ae." Similarly, frame "B" consists of an odd field "Bo" and an even field "Be." Similar odd and even fields exist for the other input frames. The term "progressive" as applied to the input frames (A, B, C, D, E and F) means that the odd field and the even field of each frame are taken at the same time and combined together to form their respective frame.

Figure 3:
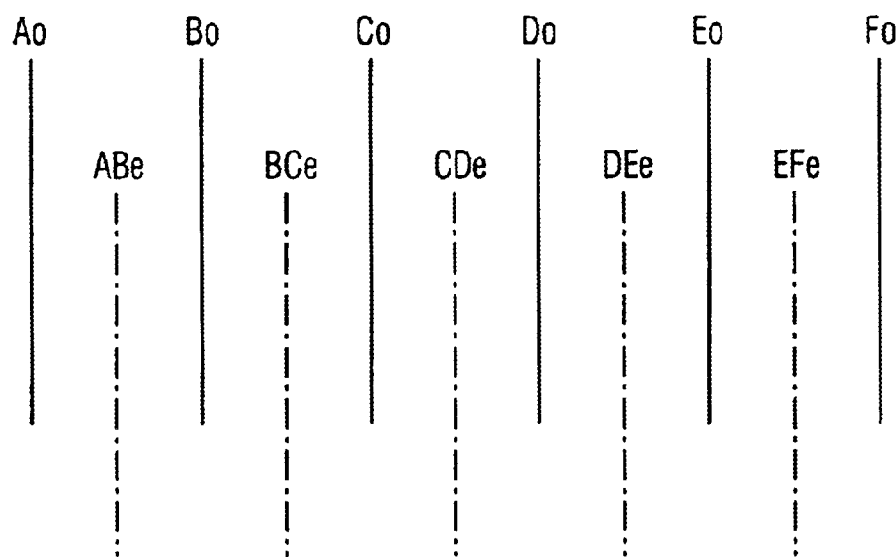
FIG. 3 illustrates a series of output interlace fields of a video signal.

As shown in FIG. 3, the output video signals are interlaced in format. The output odd field "Ao" is taken from input frame "A." The output even field "ABe" is obtained by performing motion compensation on frame "A" and on odd field "Bo" of the input sequence. In a similar manner, the output odd field "Bo" is taken from input frame "B." The output even field "BCe" is obtained by performing motion compensation on frame "B" and on odd field "Co" of the input sequence. The remaining interlaced output video signals shown in FIG. 3 are similarly obtained. In this manner the temporally missing fields are generated by using (1) the previous frame, and (2) the next frame, and (3) the motion vectors.

The motion vectors from field and line rate converter 130 are scaled in accordance with the downsample factor (DSF) that was applied to the HD input in pre-filter and downsampler unit 150. For example, assume that mvx(i,j) and mvy(i,j) are the motion vectors in the x and y directions, respectively, that are obtained from field and line rate converter 130. Then the HD motion vectors generated in motion vector post processing unit 170 will be:

$$\text{mvxHD}[(DSF)i, (DSF)j] = (DSF)\text{mvx}(i,j) \quad (1)$$

$$\text{mvyHD}[(DSF)i, (DSF)j] = (DSF)\text{mvy}(i,j) \quad (2)$$

It is seen that not only is the velocity (i.e., magnitude) of the motion vectors scaled, but also the position of the motion vectors. This means that, if in an SD video image, the motion vector was applicable to a block of two by two (2×2), in HD it will be applicable to a block of (DSF times 2) by (DSF times 2). In other words, it will be applicable to a block of (2 DSF) by (2 DSF). Therefore, if the downsample factor is two (DSF=2) then the motion vector for a two by two block (2×2) in SD is applicable to a four by four block (4×4) in HD. This scaling causes a loss in the accuracy of the motion vector.

The motion vectors that are obtained from field and line rate converter 130 are accurate to one fourth (0.25) of a pixel. If the motion vectors are scaled by a factor of two (2), then it is to be expected that the motion vectors will only be accurate to one half (0.50) of a pixel. This is because two times one fourth is equal to one half (2×0.25=0.50). Unfortunately, this expectation is not met because it turns out that the motion vectors are not accurate to one half (0.50) of a pixel. This is due to the fact that the filtering and downsampling of the HD input performed in pre-filter and downsampler unit 150 causes smoothing of the picture and smoothing of the object motion. The half pixel accuracy can not be reliably achieved due to the smoothing introduced during the filtering and downsampling process.

This means that it is not possible to achieve an accuracy of one fourth (0.25) of a pixel by performing simple calculations on the neighboring pixels that surround the pixel in question. It also means that the scaled motion vectors may not be very reliable, especially at the edges of the video image.

Given a frame, a field, and the associated motion vectors, the task is to upconvert the information into an HD signal while minimizing distortions and inaccuracies in the video signal. One prior art approach is to average the motion compensated pixels from the frame and the field. This method works reasonably well if the motion vectors are accurate. If the motion vectors are not accurate, however, the averaging of the pixels from the frame and the field will produce blurring of the picture, which can be very noticeable in slow moving areas of the video image.

Figure 4:
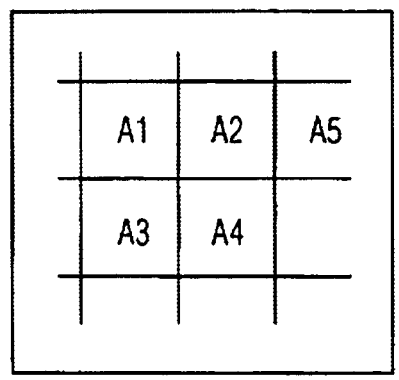
FIG. 4 illustrates a previous frame A of a video signal showing five pixels for display at time T.
Figure 5:
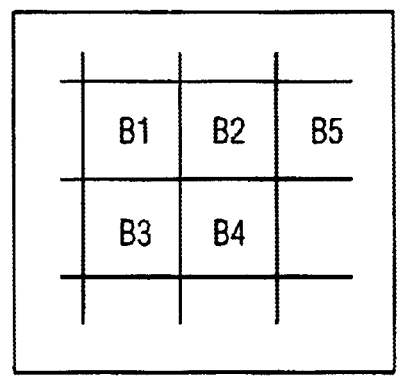
FIG. 5 illustrates a next field B of a video signal showing a corresponding set of five pixels for display at time T+1.
Figure 6:
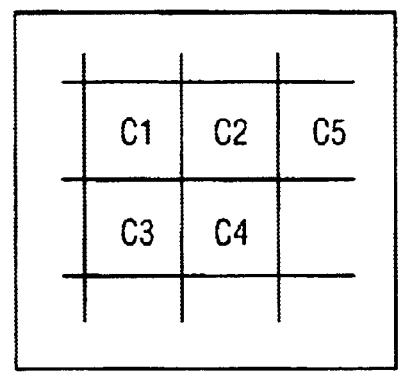
FIG. 6 illustrates a generated field C of a video signal showing a corresponding set of five pixels generated by motion compensation for display at intermediate time T+½.

The prior art method of averaging the motion compensated pixels from the frame and the field may be illustrated with an example using the three figures shown in FIG. 4, FIG. 5 and FIG. 6. FIG. 4 shows a previous frame A of a video signal showing five pixels (A1, A2, A3, A4 and A5) for display at time T. FIG. 5 shows a next field B of a video signal showing a corresponding set of five pixels (B1, B2, B3, B4 and B5) for display at time T+1. The unit "1" in the expression "T+1" represents one unit of time between previous frame A and next field B. FIG. 6 shows a generated field C of a video signal showing a corresponding set of five pixels (C1, C2, C3, C4 and C5) generated by motion compensation for display at intermediate time T+½ between previous frame A and next field B. The unit "½" in the expression "T+½" represents one half unit of time between previous frame A and generated field C.

Consider pixel C4 in generated field C. The task is to find and generate the appropriate value for this pixel. Pixel A4 in previous frame A is the motion compensated pixel in previous frame A that corresponds to pixel C4. Pixel B4 in next field B is the motion compensated pixel in next field B that corresponds to pixel C4. The prior art averaging method adds the value of pixel A4 to the value of pixel B4 and divides the sum of the values by two to obtain the value of pixel C4.

This prior art method of averaging is sequentially applied to average each pixel in previous frame A with its corresponding pixel in next field B to create an averaged set of pixels for generated field C.

In contrast, the improved method of the present invention considers each pixel individually and determines whether the motion vector associated with the pixel under consideration is accurate. If the motion vector for the pixel under consideration is accurate, then the averaging method is used for that pixel. If the motion vector for the pixel under consideration is not accurate, the averaging method is not used. Instead, as will be more fully explained, a more accurate value for the pixel is used that has been previously recorded during the motion compensation process.

In the improved method of the present invention, the HD motion vectors from motion vector post processing unit 170 are sent to HD upconversion unit 180. As shown in FIG. 1, HD upconversion unit 180 is also connected to HD input 120 and receives the input HD video signal from HD input 120. HD upconversion unit 180 than has the following data: (1) the motion vectors from the SD video image appropriately scaled, and (2) the HD frame, and (3) the HD field, and (4) the causal region of the motion compensated field. The causal region is a region of the motion compensated field that is made up of pixels whose motion compensated values have already been calculated.

As previously indicated, the values of the motion vectors are good in the global sense but they are not accurate to one half (0.50) of a pixel. The motion vectors may only be accurate to one or two pixels. This means that when the prior art averaging method is used, the edges will exhibit blurring. In order to avoid blurring the video image, the improved method of the present invention averages the frame motion compensated pixel with the field motion compensated pixel only when the motion vector for the pixel is accurate. When the motion vector for the pixel in not accurate, the improved method of the present invention selects and uses a previously recorded value of the pixel. If a previous value of the pixel has not been recorded, the improved method of the present invention uses some other motion compensation method to obtain a value of the pixel.

Figure 7:
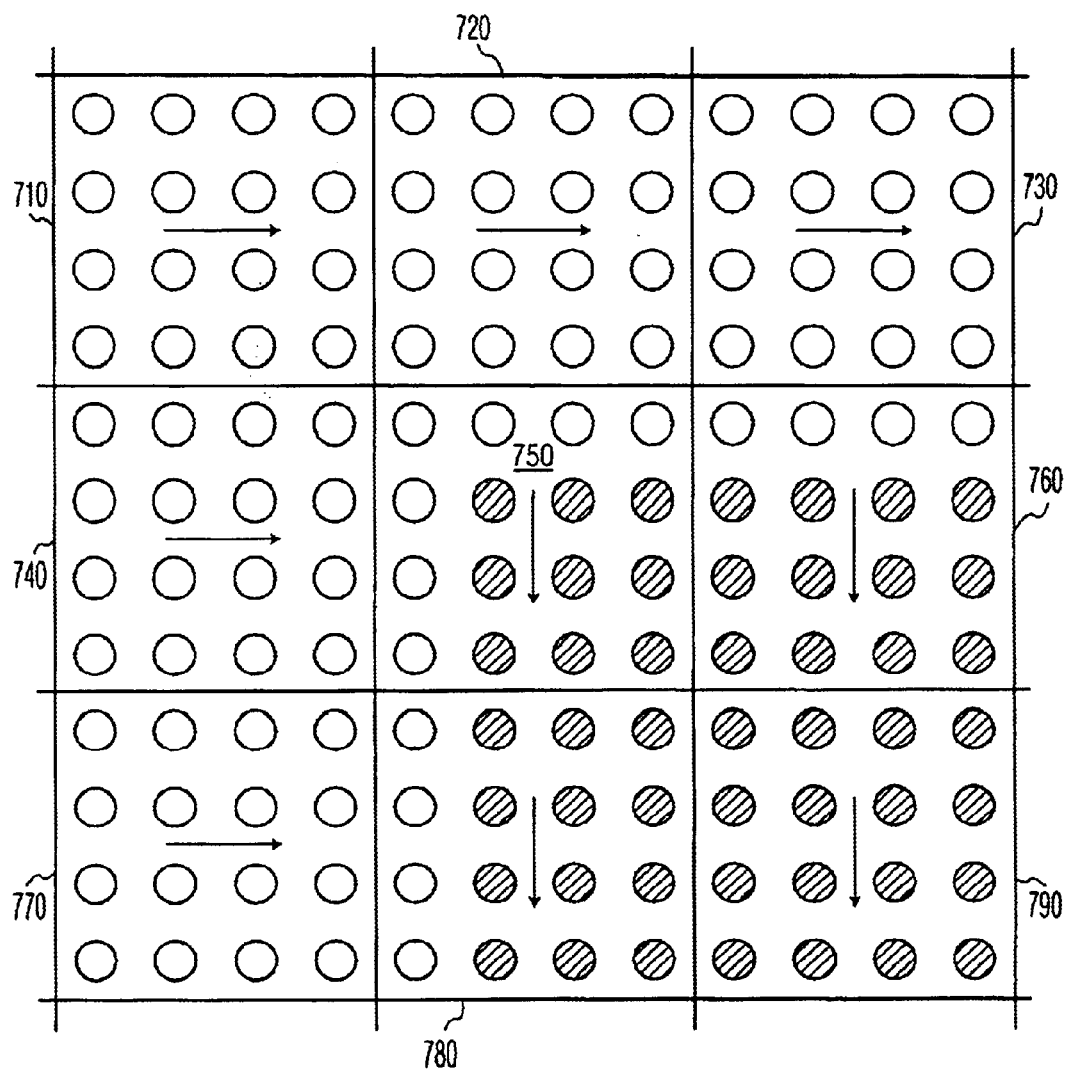
FIG. 7 illustrates a group of nine blocks of pixels (containing sixteen pixels in each block) in which a first set of pixels depicts a first object moving in a first direction and a second set of pixels depicts a second object moving in a second direction.
Figure 8:
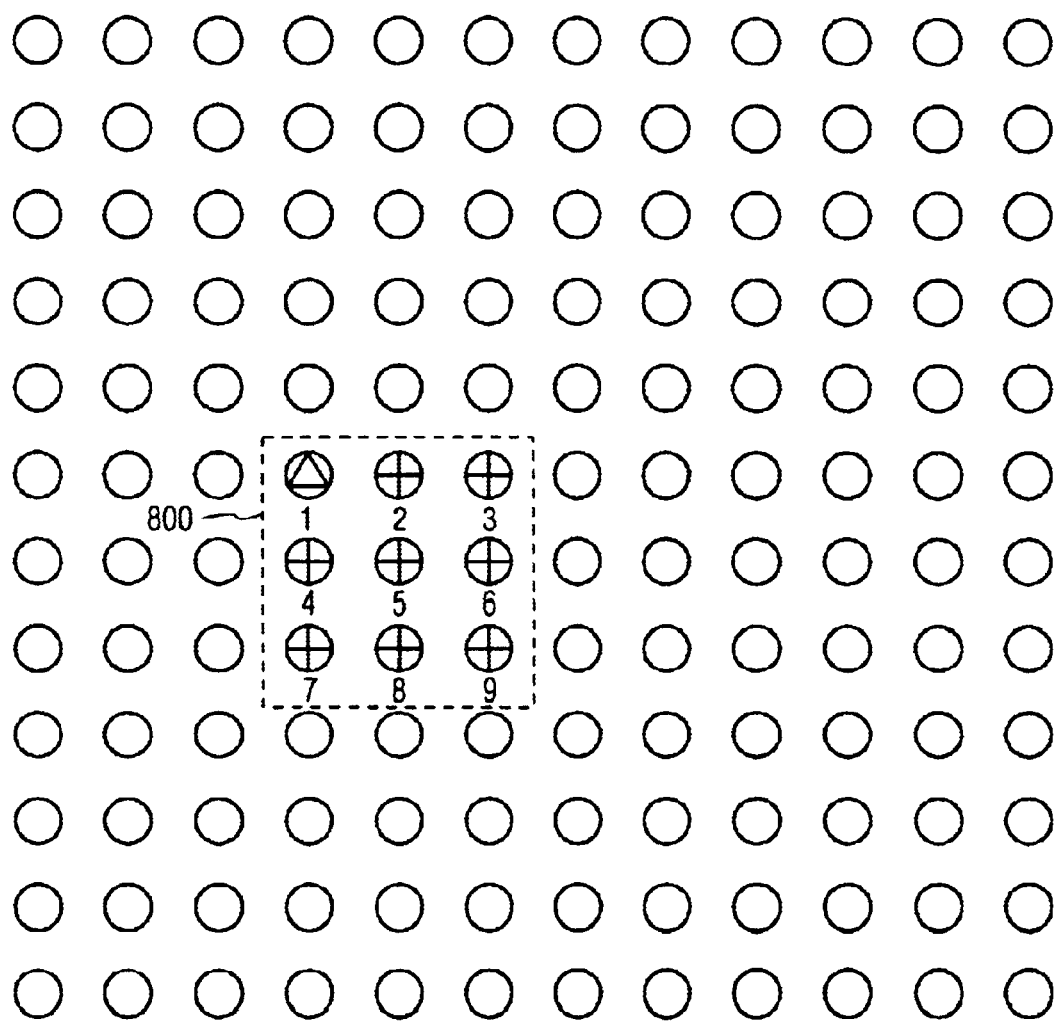
FIG. 8 illustrates a three by three pixel block used to obtain the values of a group of nine pixels within the three by three pixel block for use in the block based motion compensation method of the present invention.
Figure 9:
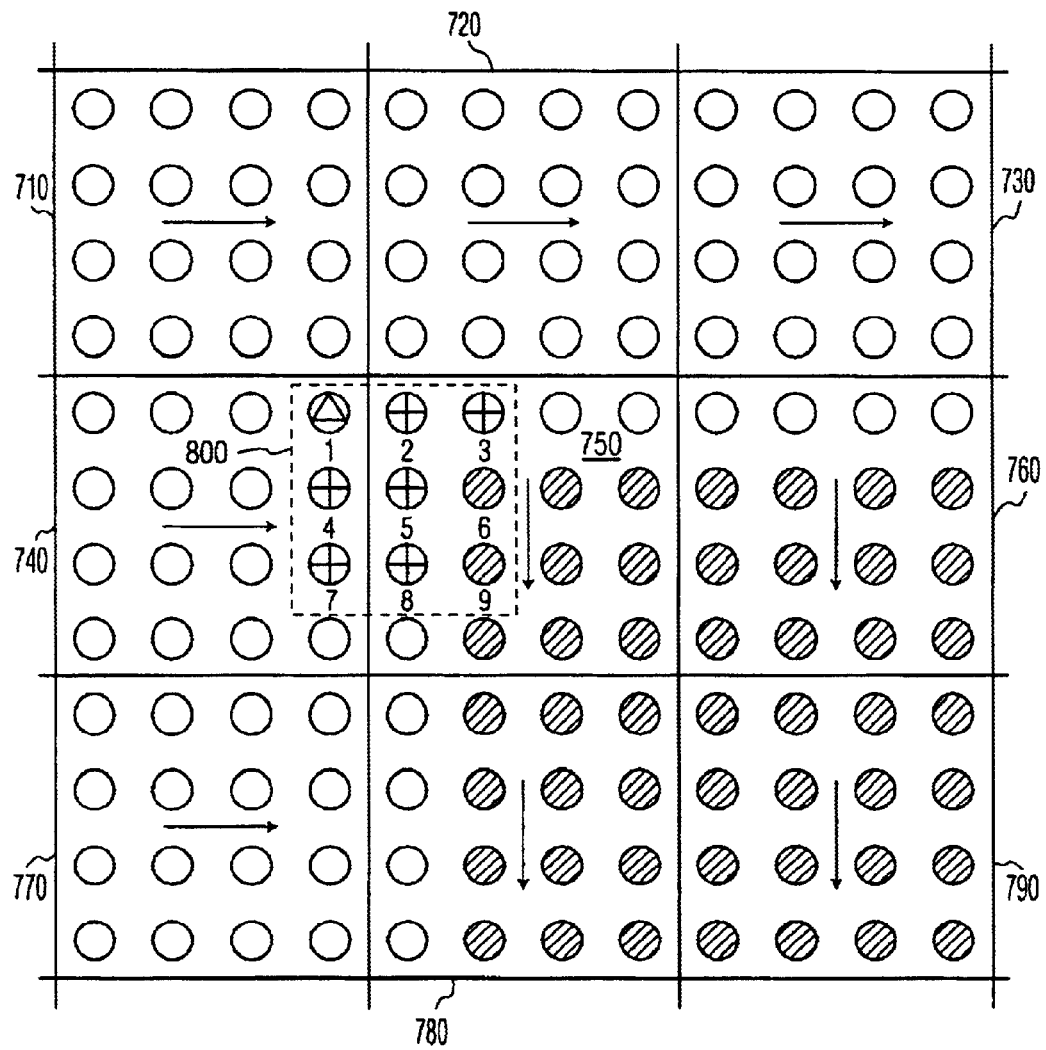
FIG. 9 illustrates the three by three pixel block shown in FIG. 8 superimposed on the group of nine blocks of pixels shown in FIG. 7.

The improved method of the present invention may be illustrated with an example using the three figures shown in FIG. 7, FIG. 8 and FIG. 9. FIG. 7 illustrates a group of one hundred forty four (144) pixels divided into nine (9) blocks, each of which contains sixteen (16) pixels. The sixteen (16) pixels in each block are arranged in a four by four array. The empty circles represent a first set of pixels that depict a first object that is moving from left to right. The filled circles represent a second set of pixels that depict a second object that is moving from top to bottom.

In the center of each block containing a four by four pixel array is an arrow that represents a motion vector for the block. Blocks 710, 720, 730, 740, and 770, each contain a motion vector indicating movement from left to right. Blocks 750, 760, 780, and 790, each contain a motion vector indicating movement from top to bottom. Blocks 710, 720, 730, 740, and 770 each contain only pixels that are represented by empty circles. Block 790 contains only pixels that are represented by filled circles. Blocks 750, 760, and 780, each contain some pixels that are represented by empty circles and some pixels that are represented by filled circles.

In block based motion compensation, it is common for a block to contain pixels that represent two different objects in a video image. It is also common for the two different objects to be moving in different directions. Ideally, there should be a motion vector assigned to the direction of motion of each different section in such a block. Unfortunately, that is not the case. The motion vector estimator will select only one motion vector for each block. The motion vector that is usually selected (by most types of motion vector estimators) is one that gives the least sum of absolute differences.

The assignment of only one motion vector to each block means that it is possible that some pixels within a block will have correct motion vectors and some pixels within the same block will have incorrect motion vectors. For example, the nine filled circles in the lower right hand corner of block 750 have correct (top-to-bottom) motion vectors. The remaining seven empty circles of block 750 have incorrect (top-to-bottom) motion vectors. The correct motion vector for the remaining seven empty circles of block 750 is a left-to-right motion vector. Therefore, when block based motion compensation is performed on block 750 the motion estimation for the pixels that correspond to the empty circles will be incorrect. The same problem exists in block 760 and in block 780.

The improved method of the present invention remedies this problem by individually considering each pixel and determining whether the motion vector for the block is accurate for the pixel under consideration. For example, assume one wishes to interpolate a generated field C between previous frame A and next field B. The pixels for generated field C are usually generated by averaging the motion compensated pixels of frame A (denoted by AMC) and the motion compensated pixels of next field B (denoted by BMC). If the motion vector for an individual pixel is correct, then the value of AMC for that pixel and the value of BMC for that pixel will be very nearly equal. In some cases the two values will be equal. If, however, the motion vector for an individual pixel is not correct, then the value of AMC for that pixel and the value of BMC for that pixel will not be very nearly equal. The value of AMC and the value of BMC will be very different.

Comparing the values of AMC and BMC for an individual pixel provides a simple, reliable way to determine whether a particular motion vector is correct or incorrect for the individual pixel under consideration. A determination that the values of AMC and BMC for an individual pixel are very different (i.e., not close in value) indicates that the motion vector associated with the pixel is incorrect.

While performing motion compensation on an individual pixel, the improved method of the present invention saves the values of a number of additional adjacent pixels. In one advantageous embodiment of the present invention shown in FIG. 8, the additional adjacent pixels whose values are saved are located in a three pixel by three pixel array 800. Pixel 1 in array 800 (labeled with a triangle) represents the pixel for which motion compensation is being performed. Pixel 2, pixel 3, pixel 4, pixel 5, pixel 6, pixel 7, pixel 8, and pixel 9 in array 800 (labeled with crosses) represent the additional adjacent pixels whose values are saved when motion compensation is performed for pixel 1.

The size of the three pixel by three pixel array 800 is by way of illustration only and should not be construed in any way to limit the scope of the invention. It is clear that the improved method of the present invention may be used in connection with arrays having dimensions other than three pixels by three pixels. The principle of operation of the present invention is not limited to a particular size for array 800. In general, array 800 may be a n by m array, where n is the number of rows of pixels and m is the number of columns of pixels.

To understand the operation of the improved method of the present invention, consider the placement and use of array 800. FIG. 9 illustrates the placement of array 800 on the group of pixels shown in FIG. 7. In particular, FIG. 9 illustrates the placement of array 800 on a portion of block 740 and block 750. It is seen that all of the pixels in block 740 are represented by empty circles. It is also seen that the motion vector for block 740 (left-to-right) is correct for all of the pixels in block 740. In block 750, however, the motion vector (top-to-bottom) is incorrect for all of the pixels in block 750 that are represented is by empty circles.

When motion compensation is performed on pixel 1 of array 800, the value of AMC (the corresponding motion compensated pixel from previous frame A) and the value of BMC (the corresponding motion compensated pixel from next field B) are compared. If the difference between the two values (i.e., the value of AMC minus the value of BMC) is less than a predetermined threshold, then the interpolated pixel value (for the corresponding pixel 1 in generated field C) will be equal to the average of the values of AMC and BMC. The method adds the values of AMC and BMC and divides the sum of the values by two to obtain a value for the interpolated pixel in generated field C.

An appropriate threshold value may be chosen using the fact that a pixel difference of ten or less between adjacent pixels is not too noticeable a difference. The threshold value may be chosen so that the difference between the two values AMC and BMC is less than or equal to ten. This threshold value will insure that the value of the interpolated pixel will have the appropriate video image quality.

If the difference between the two values (i.e., the value of AMC minus the value of BMC) is greater than the predetermined threshold, then the interpolated pixel value (for the corresponding pixel 1 in generated field C) will be determined by an alternate method.

When motion compensation is performed on pixel 1 of array 800, the eight values of AMC (motion compensated pixels from previous frame A) for pixels 2 through 9 of array 800 are recorded in a memory unit (not shown) in HD upconversion unit 180. Also recorded are the eight values of BMC (motion compensated pixels from next field B) for pixels 2 through 9 of array 800. In the case illustrated in FIG. 9, pixel 6 and pixel 9 of array 800 correspond to pixels that are represented by filled circles.

For each of the eight additional pixels (i.e., pixel 2 through pixel 9), the value of AMC (the corresponding motion compensated pixel from previous frame A) and the value of BMC (the corresponding motion compensated pixel from next field B) are compared. If the difference between the two values (i.e., the value of AMC minus the value of BMC) is less than a predetermined threshold, then the interpolated pixel value (for the corresponding pixel in generated field C) will be equal to the average of the values of AMC and BMC. The method adds the values of AMC and BMC and divides the sum of the values by two to obtain a value for the interpolated pixel in generated field C. For the reasons described above, the threshold value may be chosen so that the difference between the two values AMC and BMC is less than or equal to ten.

If the difference between the two values (i.e., the value of AMC minus the value of BMC) is greater than the predetermined threshold for a particular pixel, nothing is recorded in memory for that pixel location.

After the process described above has been completed for the pixel at the location of pixel 1 as shown in FIG. 9, the process is repeated (and pixel information is recorded) for each of the other pixels in block 740. This is accomplished by sequentially locating pixel 1 of array 800 on each of the other pixels in block 740 and performing the method described above.

The motion compensation process is then applied to the pixels in block 750. A comparison of the values of AMC and BMC for the pixels represented by empty circles in block 750 shows that they have an incorrect motion vector. This is indicated by a large difference between the values of AMC and BMC. That is, the values of AMC and BMC are not very nearly equal.

For the pixels that have incorrect values (due to an incorrect motion vector), a correct value may be obtained for the interpolated pixel from the previously recorded value stored in memory. For example, pixel 2, pixel 3, pixel 5, and pixel 8 in block 750 (and three other empty circle pixels outside of array 800 in block 750) have incorrect values because the motion vector of block 750 is a top-to-bottom motion vector. However, the recorded values for pixel 2, pixel 3, pixel 5, and pixel 8 that were obtained earlier (as previously described) may be used in place of the incorrect values to obtain correct interpolated values for the corresponding pixels of generated field C.

If there is no pixel value recorded for a particular pixel location, then some other type of motion compensation method must be used.

The fact that a whole object moves in one direction is useful. If the direction of movement for part of an object is known, then the direction of movement of other parts of the same object are known as well. Knowing the correct direction for part of an object enables one to accurately interpolate missing pixels.

The pixel values provided by the improved method of the present invention eliminate much of the blurring of the video image that results from the prior art averaging method. The pixel values provided by the improved method of the present invention give a sharply defined motion compensated video image. In cases where the pixel to be selected is located in an area of an object that is being covered (or that is being uncovered) during video image motion, the pixel values provided by the improved method of the present invention help select the better pixel of the two pixels choices. This improves the video image quality of covered (and uncovered) regions of the object.

HD upconversion unit 180 performs the improved method of the present invention to select the appropriate pixels to make up generated field C. Generated field C is then interpolated (at time T+½) between previous frame A (at time T) and next field B (at time T+1). The interpolation process is repeatedly applied to create appropriate output interlace fields ABe, BCe, CDe, DEe and EFe shown in FIG. 3. The output of HD upconversion unit 180 is sent to HD output 190.

Figure 10:
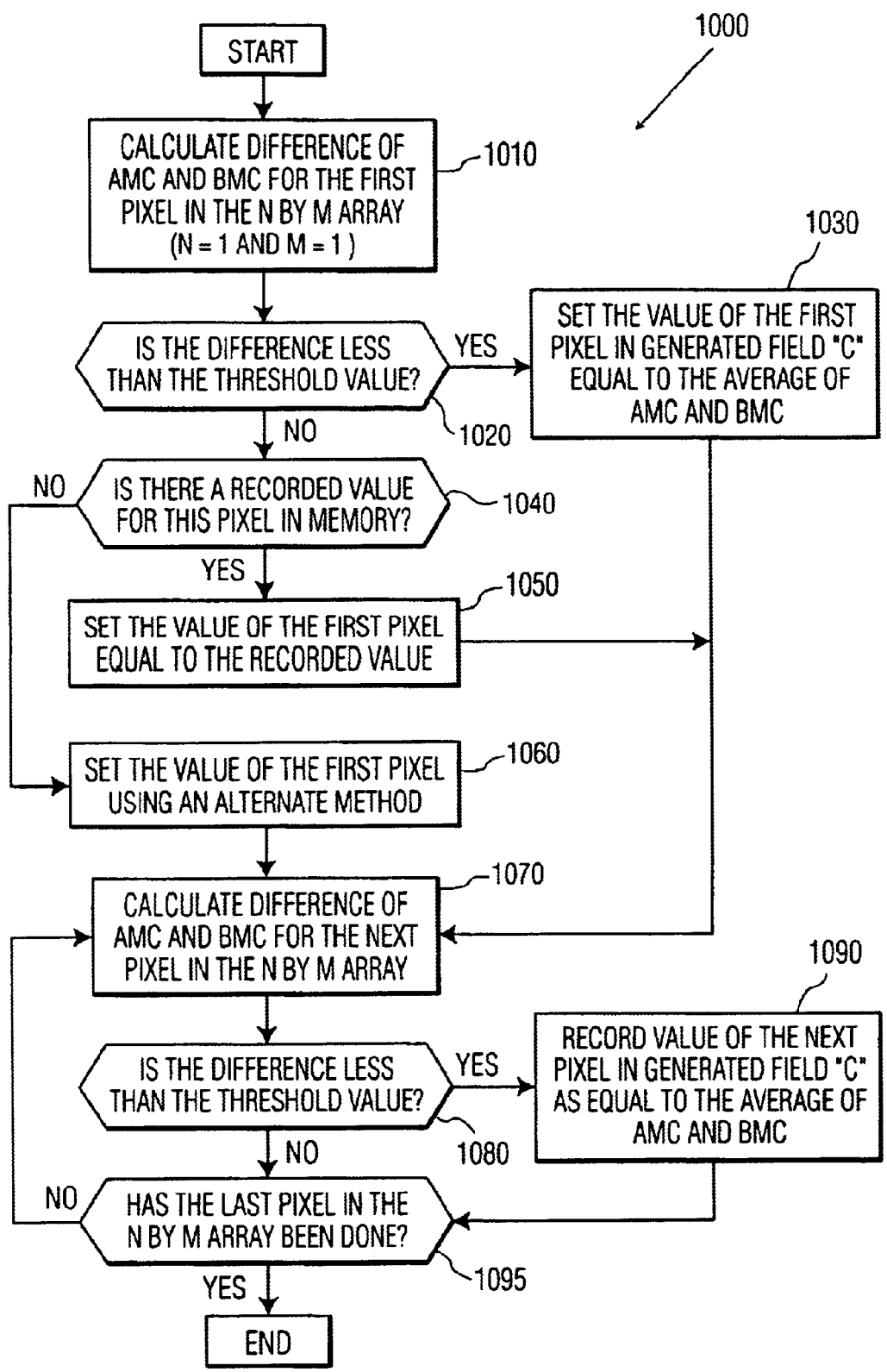
FIG. 10 is a flow diagram illustrating a first portion of the improved method of the present invention.

FIG. 10 is a flow diagram illustrating a first portion of the improved method of the present invention. The steps of the first portion of the improved method are collectively referred to with reference number 1000. In the first step the first pixel in n by m array 800 is motion compensated. The first pixel in array 800 is the pixel for which the value of n is one and the value of m is one. In the previously described example, the maximum value of n is three and the maximum value of m is three. It is clear, however, that the values n and m may be selected to have any positive integer value.

The difference of AMC and BMC for the first pixel is calculated by subtracting the value of BMC from the value of AMC (step 1010). Then a determination is made whether the difference is less than the threshold value (decision step 1020). If the difference is less than the threshold value, then the value of the first pixel in generated field C is set equal to the average value of AMC and BMC (step 1030). After step 1030 has been completed, control passes to step 1070.

If the difference is not less than the threshold value, then a determination is made whether there is a recorded value in memory for the first pixel (decision step 1040). If there is a recorded value in memory, then the value of the first pixel in generated field C is set equal to the recorded value (step 1050). After step 1050 has been completed, control passes to step 1070. If there is no recorded value in memory, then the value of the first pixel in generated field C is determined using an alternate method (step 1060). After step 1060 has been completed, control passes to step 1070.

After step 1030 (or step 1050 or step 1060) has been completed, control passes to step 1070 where the difference of AMC and BMC for the next pixel in array 800 is calculated. The next pixel value of BMC is subtracted from the next pixel value of AMC (step 1070). Then a determination is made whether the difference for the next pixel is less than the threshold value (decision step 1080). If the difference is less than the threshold value, then the value of the corresponding pixel in generated field C is set equal to the average value of next pixel AMC and next pixel BMC and recorded in memory (step 1090). After step 1090 has been completed, control passes to decision step 1095.

If the difference is not less than the threshold value, no value is recorded for the corresponding pixel in generated field C and control passes to decision step 1095. Decision step 1095 determines whether the last pixel in array 800 has been processed. If the last pixel has not been processed, control returns to step 1070 and the next pixel in array 800 is processed. If the last pixel in array 800 has been processed, the first portion of the improved method of the present invention terminates its operation (end step).

The first portion of the improved method of the present invention performs motion compensation on the first pixel in array 800 and saves the correct values of the additional pixels that are located within array 800. The first portion of the improved method of the present invention is repeatedly performed as each pixel in a block of pixels (e.g., block 740) is motion compensated. The information concerning pixel values acquired by the first portion of the improved method is used in the second portion of the improved method, which will now be described.

Figure 11:
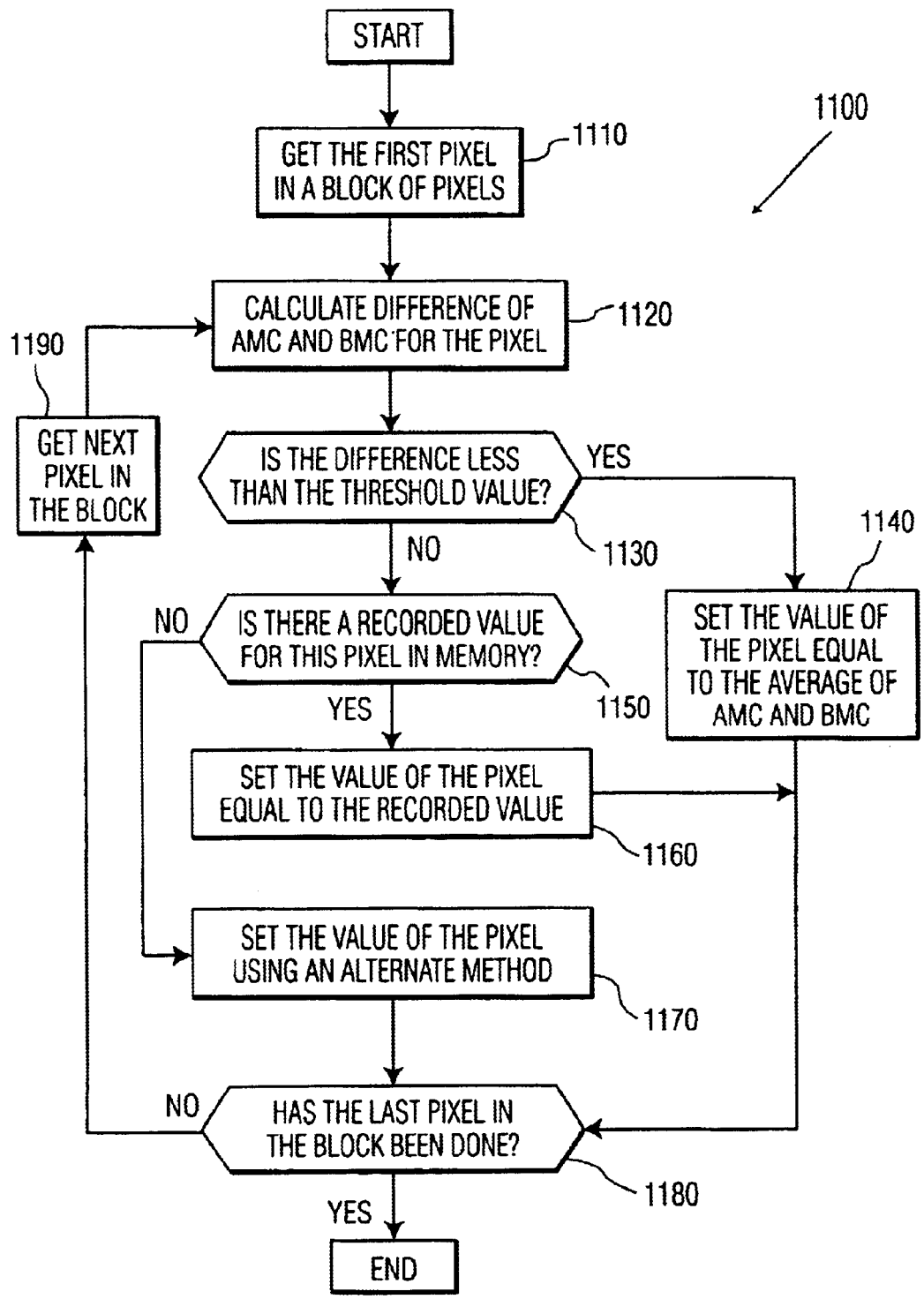
FIG. 11 is a flow diagram illustrating a second portion of the improved method of the present invention.

FIG. 11 is a flow diagram illustrating a second portion of the improved method of the present invention. The steps of the second portion of the improved method are collectively referred to with reference number 1100. The second portion of the improved method uses the pixel values recorded by the first portion of the improved method to provide improved accuracy during the process of block based motion compensation.

In the first step the first pixel in a block of pixels (e.g., block 750) is obtained (step 1110). The difference of AMC and BMC for the pixel is calculated by subtracting the value of BMC from the value of AMC (step 1120). Then a determination is made whether the difference is less than the threshold value (decision step 1130). If the difference is less than the threshold value, then the value of the first pixel in generated field C is set equal to the average value of AMC and BMC (step 1140). After step 1140 has been completed, control passes to decision step 1180.

If the difference in step 1130 is not less than the threshold value, then a determination is made whether there is a recorded value for the pixel in memory (decision step 1150). If there is not a recorded value for the pixel in memory, control passes to step 1170 and the value of the pixel is set using an alternate method. After step 1170 has been completed, control passes to decision step 1180.

If there is recorded value for the pixel in memory, then the value of the pixel is set equal to the recorded value (step 1160). After step 1160 has been completed, control passes to decision step 1180.

Decision step 1180 determines whether the last pixel in the block has been processed. If the last pixel has not been processed, the next pixel in the block is obtained (step 1190) and control passes to step 1120 where the next pixel is processed. If the last pixel in the block has been processed, the second portion of the improved method of the present invention terminates its operation (end step). The second portion of the improved method of the present invention may be used repeatedly on each subsequent block of pixels as required.

The improved method of the present invention has been described using an illustrative example in which there were two different motion vectors present. It is clear, however, that the principle of the improved method of the present invention is not limited to the case of two motion vectors, but is generally applicable to any number of motion vectors (e.g., two, three, four, or more).

Similarly, although the present invention has been described in detail with respect to the illustrative example of a high definition (HD) progressive to interlace converter, the principle of the improved method of the present invention is not limited to use with that particular type of equipment. It is clear that those skilled in the art should understand that they can make various changes, substitutions and alterations herein without departing from the spirit and scope of the invention in its broadest form.

What is claimed is:

1. For use in a video image upconversion unit of the type that uses motion compensation to generate an interpolated field using motion vectors, a method of motion compensation comprising the steps of:

calculating for a pixel within an array of n pixels by m pixels the difference in value between the value of a corresponding motion compensated pixel from a previous frame and the value of a corresponding motion compensated pixel from a next field;

comparing said difference with a threshold value;

setting the value of said pixel within said array of n pixels by m pixels equal to the average of the value of said corresponding motion compensated pixel from said previous frame and the value of said corresponding motion compensated pixel of said next field if the value of said difference is less than said threshold value; and recording said value for said pixel within said array of n pixels by m pixels.

2. The method as claimed in claim 1 further comprising the steps of:

calculating for each of a plurality of pixels within an array of n pixels by m pixels the difference in value between the value of a corresponding motion compensated pixel from a previous frame and the value of a corresponding motion compensated pixel from a next field;

comparing said difference with a threshold value;

setting the value of each of said plurality of pixels within said array of n pixels by m pixels equal to the average of the value of said corresponding motion compensated pixel from said previous frame and the value of said corresponding motion compensated pixel of said next field if the value of said difference is less than said threshold value; and recording said values for said plurality of pixels within said array of n pixels by m pixels.

3. The method as claimed in claim 2 wherein said threshold value is not greater than ten.

4. The method as claimed in claim 2 further comprising the steps of:

calculating for a pixel within a block of pixels the difference in value between the value of a corresponding motion compensated pixel from a previous frame and the value of a corresponding motion compensated pixel from a next field;

comparing said difference with a threshold value;

setting the value of said pixel within said block of pixels to the average of the value of said corresponding motion compensated pixel from said previous frame and the value of said corresponding motion compensated pixel of said next field, if the value of said difference is less than said threshold value; and setting the value of said pixel within said block of pixels equal to a value that was previously recorded for said pixel when said pixel was evaluated as a pixel element within said array of n pixels by m pixels, if the value of said difference is not less than said threshold value, and if a recorded value for said pixel was previously recorded.

5. The method as claimed in claim 4 further comprising the steps of:

calculating for each of a plurality of pixels within said block of pixels the difference in value between the value of a corresponding motion compensated pixel from a previous frame and the value of a corresponding motion compensated pixel from a next field;

comparing said difference with a threshold value;

setting the value of each of said plurality of pixels within said block of pixels to the average of the value of said corresponding motion compensated pixel from said previous frame and the value of said corresponding motion compensated pixel of said next field, if the value of said difference is less than said threshold value; and setting the value of each of said plurality of pixels within said block of pixels equal to a value that was previously recorded for each of said plurality of pixels when each of said plurality of pixels was evaluated as a pixel element within said array of n pixels by m pixels, if the value of said difference is not less than said threshold value, and if a recorded value for said pixel was previously recorded.

6. The method as claimed in claim 5 wherein said threshold value is not greater than ten.

7. For use in a video image upconversion unit of the type that uses motion compensation to generate an interpolated field using motion vectors, a method of motion compensation comprising the steps of:

performing motion compensation on a pixel;

determining whether a motion vector assigned to said pixel is incorrect;

obtaining a previously recorded pixel value for said pixel when it is determined that said motion vector assigned to said pixel is incorrect, said previously recorded pixel value being determined by a method comprising the steps of:

calculating for said pixel when said pixel is a pixel element within an array of n pixels by m pixels the difference in value between the value of a corresponding motion compensated pixel from a previous frame and the value of a corresponding motion compensated pixel from a next field, comparing said difference with a threshold value, and setting the value of said pixel within said array of n pixels by m pixels equal to the average of the value of said corresponding motion compensated pixel from said previous frame and the value of said corresponding motion compensated pixel of said next field if the value of said difference is less than said threshold value; and setting the value of said pixel equal to said previously recorded pixel value for said pixel.

8. The method as claimed in claim 7 wherein said threshold value is not greater than ten.

9. The method as claimed in claim 7 wherein said step of determining whether a motion vector assigned to said pixel is incorrect comprises the steps of:

obtaining a value of a corresponding motion compensated pixel from a previous frame;

obtaining a value of a corresponding motion compensated pixel from a next field;

calculating the difference in value between said value of said corresponding motion compensated pixel from said previous frame and said value of said corresponding motion compensated pixel from said next field;

comparing said difference with a threshold value;

determining that said motion vector assigned to said pixel is incorrect if said difference is greater than said threshold value.

10. The method as claimed in claim 9 wherein said threshold value is not greater than ten.

11. For use in a video image upconversion unit of the type that uses motion compensation to generate an interpolated field using motion vectors, a method of motion compensation comprising the steps of:

performing motion compensation on a first pixel in a plurality of pixels within an array of n pixels by m pixels;

determining pixel values for each of said plurality of pixels within said array of n pixels by m pixels other than said first pixel, said pixel values being determined by a method comprising the steps of:

calculating for each of said plurality of pixels within said array of n pixels by m pixels other than said first pixel the difference in value between the value of a corresponding motion compensated pixel from a previous frame and the value of a corresponding motion compensated pixel from a next field, comparing said difference with a threshold value, and setting the value of each of said plurality of pixels within said array of n pixels by m pixels other than said first pixel equal to the average of the value of said corresponding motion compensated pixel from said previous frame and the value of said corresponding motion compensated pixel of said next field if the value of said difference is less than said threshold value; and recording said pixel values for each of said plurality of pixels within said array of n pixels by m pixels other than said first pixel.

12. The method as claimed in claim 11 Wherein said threshold value is not greater than ten.

13. The method as claimed in claim 11 further comprising the steps of:

performing motion compensation on each of a plurality of pixels in a block of pixels; and determining whether a motion vector assigned to a pixel of said plurality of pixels in said block of pixels is incorrect.

14. The method as claimed in claim 13 further comprising the steps of:

obtaining a previously recorded pixel value for said pixel when it is determined that said motion vector assigned to said pixel is incorrect; and setting the value of said pixel equal to said previously recorded pixel value for said pixel, where said previously recorded pixel value is one of said pixel values recorded for each of said plurality of pixels within said array of n pixels by m pixels other than said first pixel.

15. The method as claimed in claim 13 wherein said motion vector assigned to a pixel of said plurality of pixels in said block of pixels is one of a plurality of motion vectors assigned to pixels in said block of pixels.

16. The method as claimed in claim 13 wherein said array of n pixels by m pixels is repeatedly located in different positions with respect to said plurality of pixels in said block of pixels to obtain pixel values for each of said plurality of pixels in said block of pixels.

17. The method as claimed in claim 13 wherein the step of determining whether a motion vector assigned to a pixel of said plurality of pixels in said block of pixels is incorrect comprises the steps of:

obtaining a value of a corresponding motion compensated pixel from a previous frame;

obtaining a value of a corresponding motion compensated pixel from a next field;

calculating the difference in value between said value of said corresponding motion compensated pixel from said previous frame and said value of said corresponding motion compensated pixel from said next field;

comparing said difference with a threshold value;

determining that said motion vector assigned to said pixel of said plurality of pixels in said block of pixels is incorrect if said difference is greater than said threshold value.

18. A high definition progressive to interlace converter comprising a high definition video image upconversion unit that uses motion compensation to generate an interpolated field using motion vectors, wherein said high definition video image upconversion unit is capable of:

calculating for a pixel within an array of n pixels by m pixels the difference in value between the value of a corresponding motion compensated pixel from a previous frame and the value of a corresponding motion compensated pixel from a next field;

comparing said difference with a threshold value;

setting the value of said pixel within said array of n pixels by m pixels equal to the average of the value of said corresponding motion compensated pixel from said previous frame and the value of said corresponding motion compensated pixel of said next field if the value of said difference is less than said threshold value; and recording said value for said pixel within said array of n pixels by m pixels.

19. The high definition progressive to interlace converter as claimed in claim 18 wherein said high definition video image upconversion unit is capable of:

calculating for each of a plurality of pixels within an array of n pixels by m pixels the difference in value between the value of a corresponding motion compensated pixel from a previous frame and the value of a corresponding motion compensated pixel from a next field;

comparing said difference with a threshold value;

setting the value of each of said plurality of pixels within said array of n pixels by m pixels equal to the average of the value of said corresponding motion compensated pixel from said previous frame and the value of said corresponding motion compensated pixel of said next field if the value of said difference is less than said threshold value; and recording said values for said plurality of pixels within said array of n pixels by m pixels.

20. The high definition progressive to interlace converter as claimed in claim 19 wherein said high definition video image upconversion unit is capable of:

calculating for a pixel within a block of pixels the difference in value between the value of a corresponding motion compensated pixel from a previous frame and the value of a corresponding motion compensated pixel from a next field;

comparing said difference with a threshold value;

setting the value of said pixel within said block of pixels to the average of the value of said corresponding motion compensated pixel from said previous frame and the value of said corresponding motion compensated pixel of said next field, if the value of said difference is less than said threshold value; and setting the value of said pixel within said block of pixels equal to a value that was previously recorded for said pixel when said pixel was evaluated as a pixel element within said array of n pixels by m pixels, if the value of said difference is not less than said threshold value, and if a recorded value for said pixel was previously recorded.

21. The high definition progressive to interlace converter as claimed in claim 20 wherein said high definition video image upconversion unit is capable of:

calculating for each of a plurality of pixels within said block of pixels the difference in value between the value of a corresponding motion compensated pixel from a previous frame and the value of a corresponding motion compensated pixel from a next field;

comparing said difference with a threshold value;

setting the value of each of said plurality of pixels within said block of pixels to the average of the value of said corresponding motion compensated pixel from said previous frame and the value of said corresponding motion compensated pixel of said next field, if the value of said difference is less than said threshold value; and setting the value of each of said plurality of pixels within said block of pixels equal to a value that was previously recorded for each of said plurality of pixels when each of said plurality of pixels was evaluated as a pixel element within said array of n pixels by m pixels, if the value of said difference is not less than said threshold value, and if a recorded value for said pixel was previously recorded.

22. The high definition progressive to interlace converter as claimed in claim 21 wherein said threshold value is not greater than ten.

23. The high definition progressive to interlace converter as claimed in claim 18 wherein said high definition video image upconversion unit is capable of:

performing motion compensation on a first pixel in a plurality of pixels within an array of n pixels by m pixels;

determining pixel values for each of said plurality of pixels within said array of n pixels by m pixels other than said first pixel;

recording said pixel values for each of said plurality of pixels within said array of n pixels by m pixels other than said first pixel;

performing motion compensation of each of a plurality of pixels in a block of pixels;

determining whether a motion vector assigned to a pixel of said plurality of pixels in said block of pixels in incorrect;

obtaining a previously recorded pixel value for said pixel when it is determined that said motion vector assigned to said pixel is incorrect; and setting the value of said pixel equal to said previously recorded pixel value for said pixel, where said previously recorded pixel value is one of said pixel values recorded for each of said plurality of pixels within said array of n pixels by m pixels other than said first pixel.

24. A high definition receiver comprising a high definition progressive to interlace converter comprising a high definition video image upconversion unit that uses motion compensation to generate an interpolated field using motion vectors, wherein said high definition video image upconversion unit is capable of:

calculating for a pixel within an array of n pixels by m pixels the difference in value between the value of a corresponding motion compensated pixel from a previous frame and the value of a corresponding motion compensated pixel from a next field;

comparing said difference with a threshold value;

setting the value of said pixel within said array of n pixels by m pixels equal to the average of the value of said corresponding motion compensated pixel from said previous frame and the value of said corresponding motion compensated pixel of said next field if the value of said difference is less than said threshold value; and recording said value for said pixel within said array of n pixels by m pixels.

25. The high definition receiver as claimed in claim 24 wherein said high definition video image upconversion unit is capable of:

calculating for each of a plurality of pixels within an array of n pixels by m pixels the difference in value between the value of a corresponding motion compensated pixel from a previous frame and the value of a corresponding motion compensated pixel from a next field;

comparing said difference with a threshold value;

setting the value of each of said plurality of pixels within said array of n pixels by m pixels equal to the average of the value of said corresponding motion compensated pixel from said previous frame and the value of said corresponding motion compensated pixel of said next field if the value of said difference is less than said threshold value; and recording said values for said plurality of pixels within said array of n pixels by m pixels.

26. The high definition receiver as claimed in claim 25 wherein said high definition video image upconversion unit is capable of:

calculating for a pixel within a block of pixels the difference in value between the value of a corresponding motion compensated pixel from a previous frame and the value of a corresponding motion compensated pixel from a next field;

comparing said difference with a threshold value;

setting the value of said pixel within said block of pixels to the average of the value of said corresponding motion compensated pixel from said previous frame and the value of said corresponding motion compensated pixel of said next field, if the value of said difference is less than said threshold value; and setting the value of said pixel within said block of pixels equal to a value that was previously recorded for said pixel when said pixel was evaluated as a pixel element within said array of n pixels by m pixels, if the value of said difference is not less than said threshold value, and if a recorded value for said pixel was previously recorded.

27. The high definition receiver as claimed in claim 26 wherein said high definition video image upconversion unit is capable of:
calculating for each of a plurality of pixels within said block of pixels the difference in value between the value of a corresponding motion compensated pixel from a previous frame and the value of a corresponding motion compensated pixel from a next field;
comparing said difference with a threshold value;
setting the value of each of said plurality of pixels within said block of pixels to the average of the value of said corresponding motion compensated pixel from said previous frame and the value of said corresponding motion compensated pixel of said next field, if the value of said difference is less than said threshold value; and
setting the value of each of said plurality of pixels within said block of pixels equal to a value that was previously recorded for each of said plurality of pixels when each of said plurality of pixels was evaluated as a pixel element within said array of n pixels by m pixels, if the value of said difference is not less than said threshold value, and if a recorded value for said pixel was previously recorded.

28. The high definition receiver as claimed in claim 27 wherein said threshold value is not greater than ten.

29. The high definition progressive to interlace converter as claimed in claim 24 wherein said high definition video image upconversion unit is capable of:
performing motion compensation on a first pixel in a plurality of pixels within an array of n pixels by m pixels;
determining pixel values for each of said plurality of pixels within said array of n pixels by m pixels other than said first pixel;
recording said pixel values for each of said plurality of pixels within said array of n pixels by m pixels other than said first pixel;
performing motion compensation of each of a plurality of pixels in a block of pixels;
determining whether a motion vector assigned to a pixel of said plurality of pixels in said block of pixels in incorrect;
obtaining a previously recorded pixel value for said pixel when it is determined that said motion vector assigned to said pixel is incorrect; and
setting the value of said pixel equal to said previously recorded pixel value for said pixel, where said previously recorded pixel value is one of said pixel values recorded for each of said plurality of pixels within said array of n pixels by m pixels other than said first pixel.

30. A signal comprising:
an output signal of a high definition progressive to interlace converter comprising a high definition video image upconversion unit that uses motion compensation to generate an interpolated field using motion vectors, wherein said high definition video image upconversion unit generates said output signal by:
calculating for a pixel within an array of n pixels by m pixels the difference in value between the value of a corresponding motion compensated pixel from a previous frame and the value of a corresponding motion compensated pixel from a next field;
comparing said difference with a threshold value;
setting the value of said pixel within said array of n pixels by m pixels equal to the average of the value of said corresponding motion compensated pixel from said previous frame and the value of said corresponding motion compensated pixel of said next field if the value of said difference is less than said threshold value; and
recording said value for said pixel within said array of n pixels by m pixels.

31. The signal as claimed in claim 30 wherein said high definition video image upconversion unit generates said output signal by:
calculating for each of a plurality of pixels within an array of n pixels by m pixels the difference in value between the value of a corresponding motion compensated pixel from a previous frame and the value of a corresponding motion compensated pixel from a next field;
comparing said difference with a threshold value;
setting the value of each of said plurality of pixels within said array of n pixels by m pixels equal to the average of the value of said corresponding motion compensated pixel from said previous frame and the value of said corresponding motion compensated pixel of said next field if the value of said difference is less than said threshold value; and
recording said values for said plurality of pixels within said array of n pixels by m pixels.

32. The signal as claimed in claim 31 wherein said high definition video image upconversion unit generates said output signal by:
calculating for a pixel within a block of pixels the difference in value between the value of a corresponding motion compensated pixel from a previous frame and the value of a corresponding motion compensated pixel from a next field;
comparing said difference with a threshold value;
setting the value of said pixel within said block of pixels to the average of the value of said corresponding motion compensated pixel from said previous frame and the value of said corresponding motion compensated pixel of said next field, if the value of said difference is less than said threshold value; and
setting the value of said pixel within said block of pixels equal to a value that was previously recorded for said pixel when said pixel was evaluated as a pixel element within said array of n pixels by m pixels, if the value of said difference is not less than said threshold value, and if a recorded value for said pixel was previously recorded.

33. The signal as claimed in claim 32 wherein said high definition video image upconversion unit generates said output signal by:
calculating for each of a plurality of pixels within said block of pixels the difference in value between the value of a corresponding motion compensated pixel from a previous frame and the value of a corresponding motion compensated pixel from a next field;
comparing said difference with a threshold value;
setting the value of each of said plurality of pixels within said block of pixels to the average of the value of said corresponding motion compensated pixel from said previous frame and the value of said corresponding motion compensated pixel of said next field, if the value of said difference is less than said threshold value; and setting the value of each of said plurality of pixels within said block of pixels equal to a value that was previously recorded for each of said plurality of pixels when each of said plurality of pixels was evaluated as a pixel element within said array of n pixels by m pixels, if the value of said difference is not less than said threshold value, and if a recorded value for said pixel was previously recorded.

34. The signal as claimed in claim 33 wherein said threshold value is not greater than ten.

35. The signal as claimed in claim 30 wherein said high definition video image upconversion unit generates said output signal by:

performing motion compensation on a first pixel in a plurality of pixels within an array of n pixels by m pixels;

determining pixel values for each of said plurality of pixels within said array of n pixels by m pixels other than said first pixel;

recording said pixel values for each of said plurality of pixels within said array of n pixels by m pixels other than said first pixel;

performing motion compensation of each of a plurality of pixels in a block of pixels;

determining whether a motion vector assigned to a pixel of said plurality of pixels in said block of pixels in incorrect;

obtaining a previously recorded pixel value for said pixel when it is determined that said motion vector assigned to said pixel is incorrect; and setting the value of said pixel equal to said previously recorded pixel value for said pixel, where said previously recorded pixel value is one of said pixel values recorded for each of said plurality of pixels within said array of n pixels by m pixels other than said first pixel.

* * * * *